Feb. 18, 1941.   W. F. GROENE ET AL   2,232,226
CRANKSHAFT CHUCK
Filed Oct. 14, 1939   7 Sheets-Sheet 1
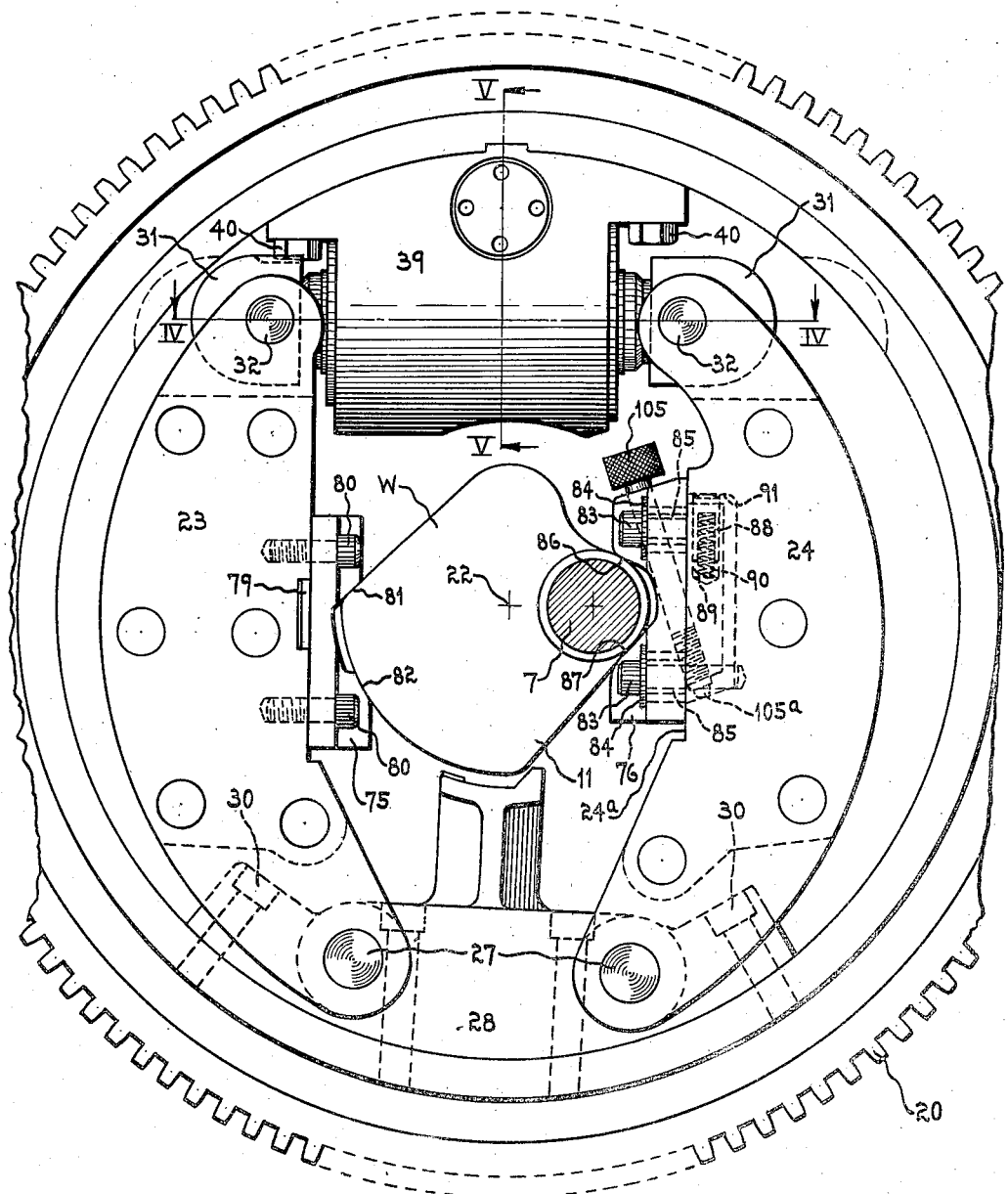
FIG. I
INVENTORS.
WILLIAM F. GROENE
HAROLD J. SIEKMANN
AND WALTER R. MEYER
BY *Willard S. Groene*
ATTORNEY.

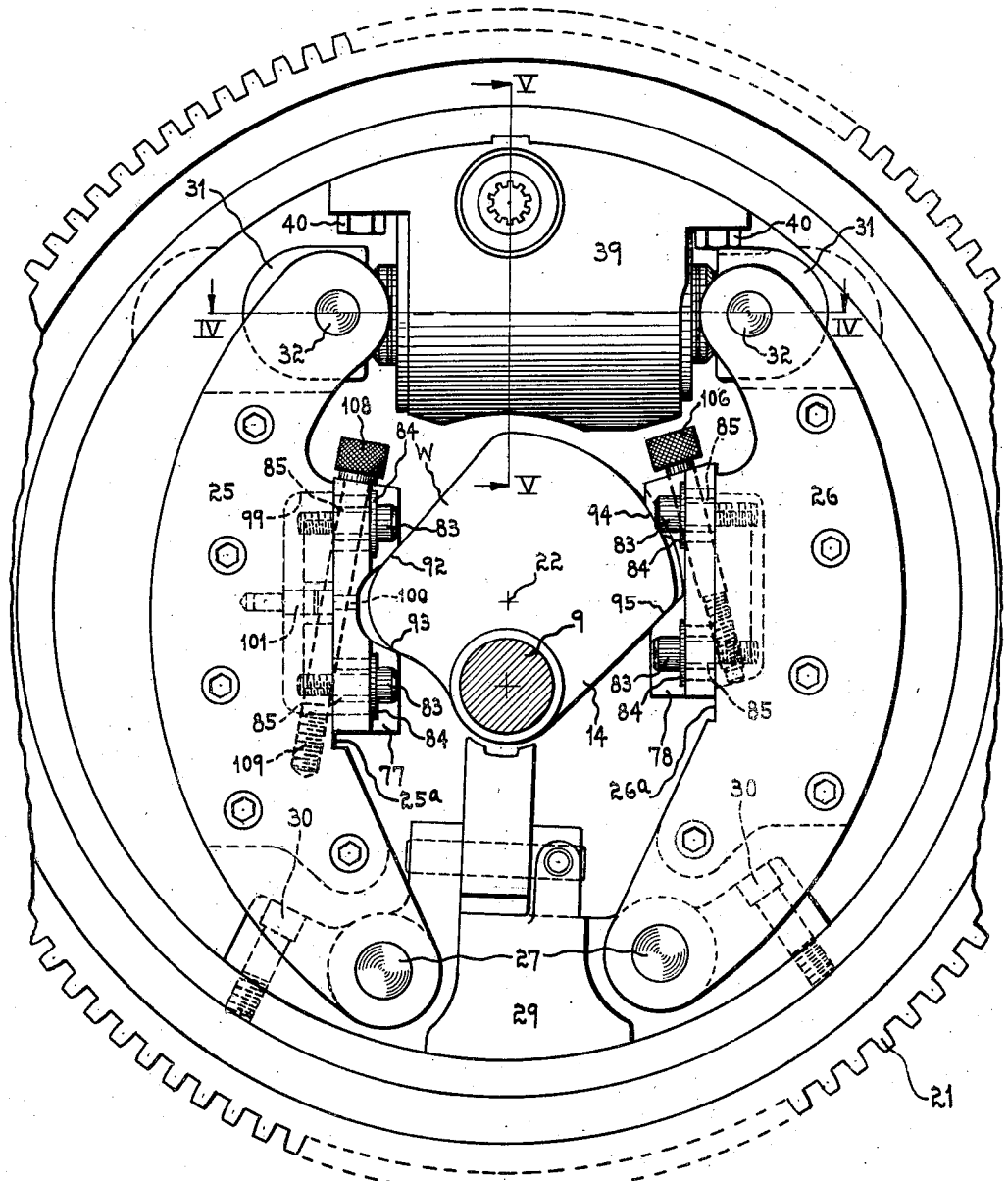
FIG. II

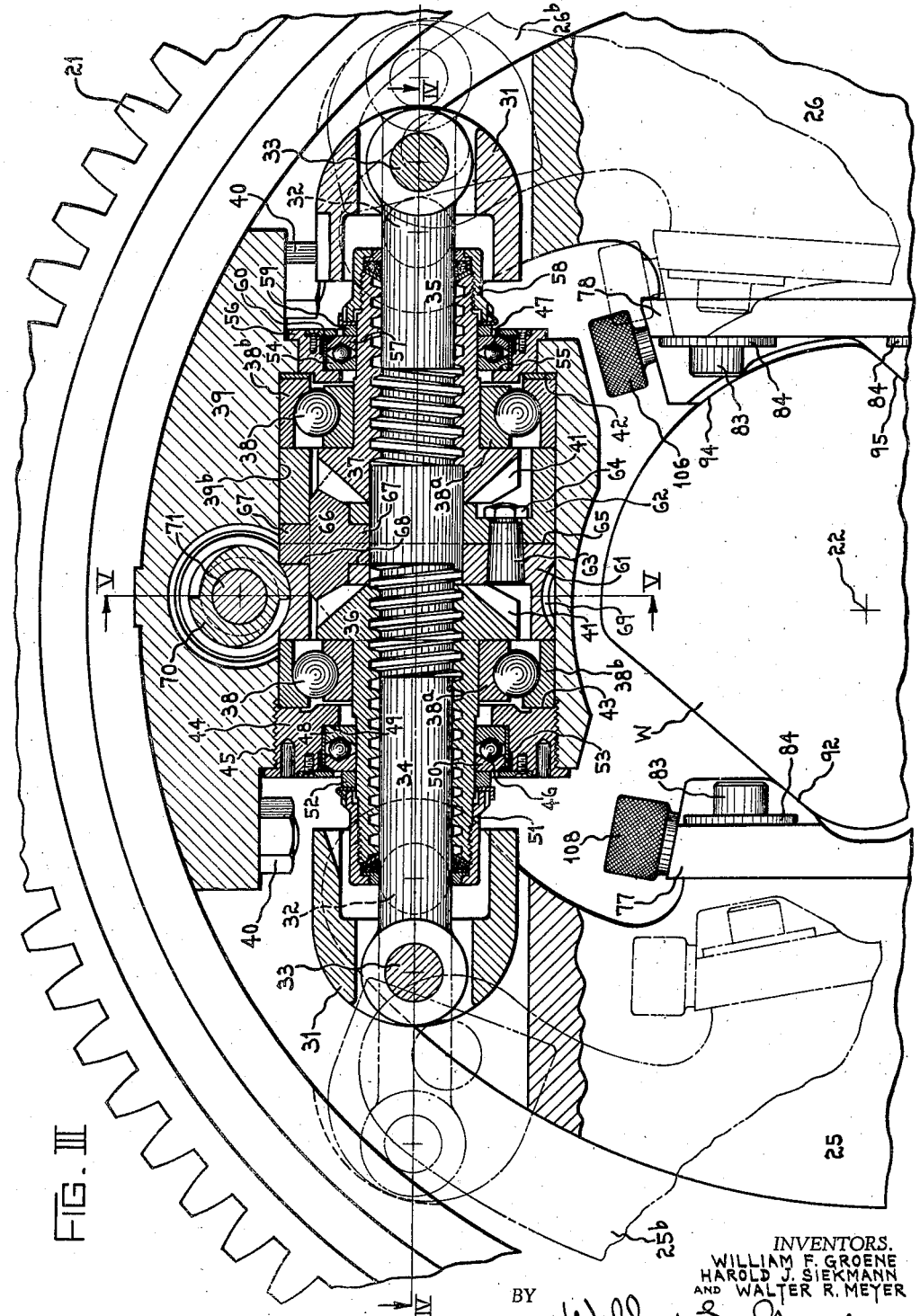

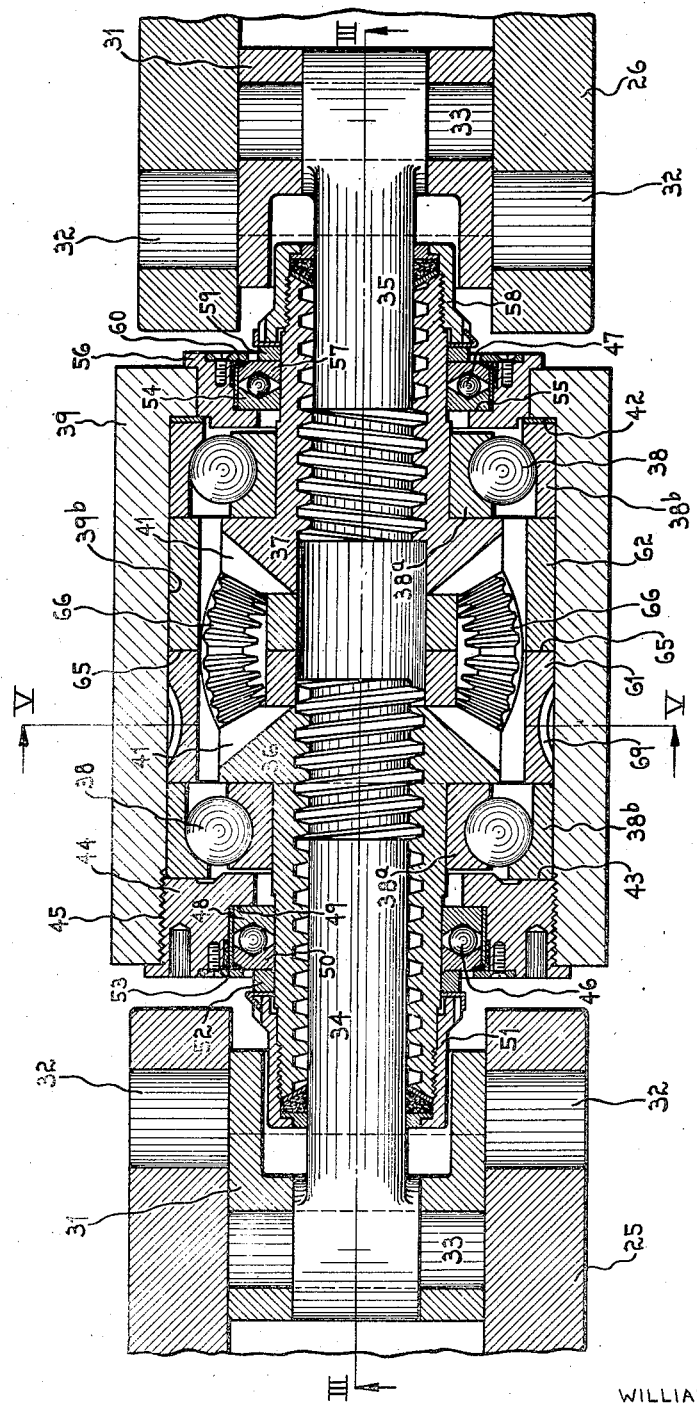

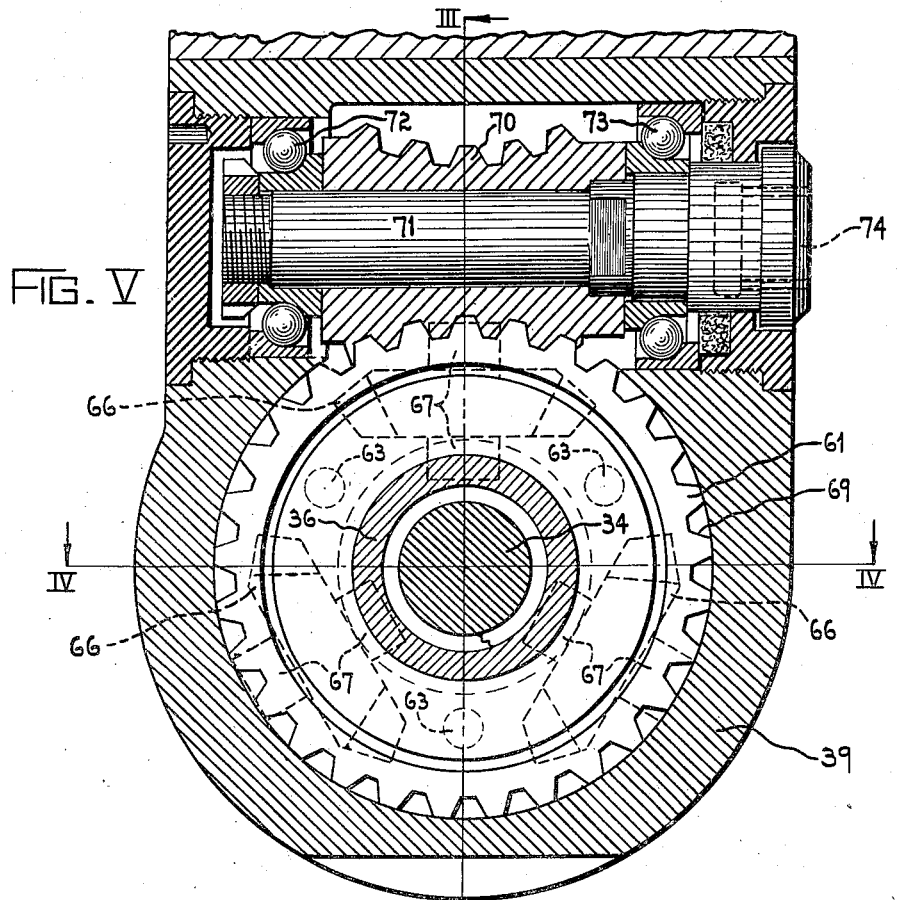
FIG. V
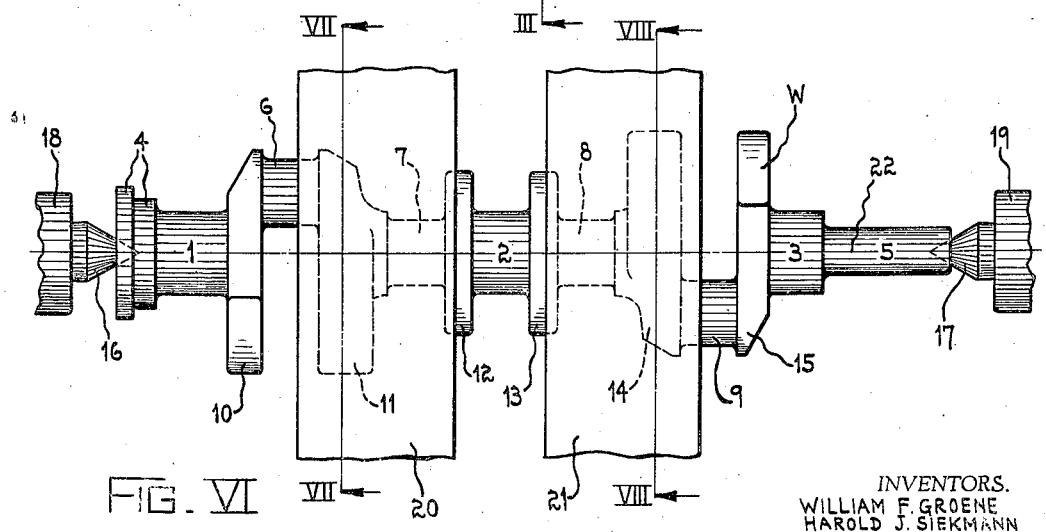
FIG. VI
INVENTORS.
WILLIAM F. GROENE
HAROLD J. SIEKMANN
AND WALTER R. MEYER
BY Willard L. Groene
ATTORNEY.

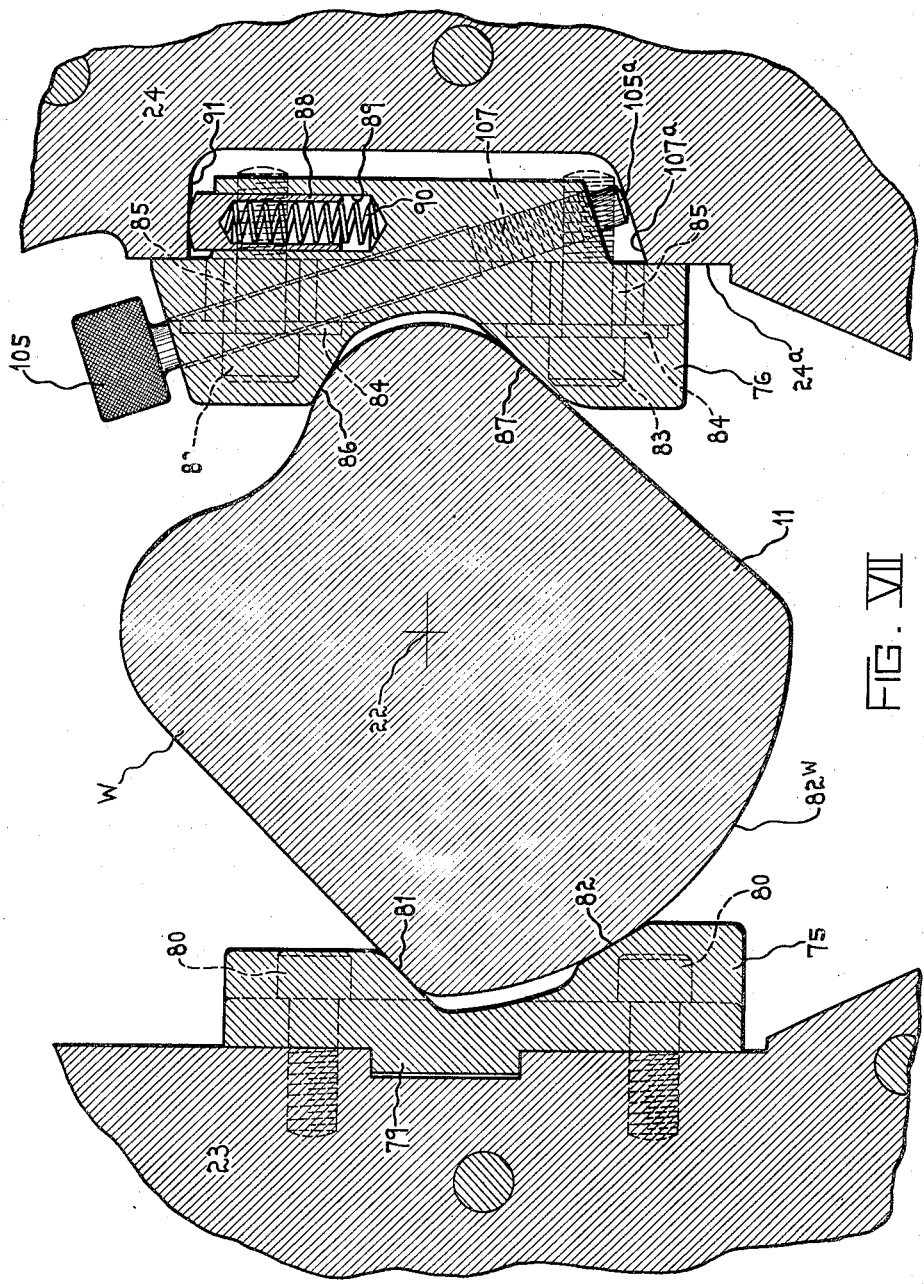

Feb. 18, 1941.  W. F. GROENE ET AL  2,232,226
CRANKSHAFT CHUCK
Filed Oct. 14, 1939  7 Sheets-Sheet 7
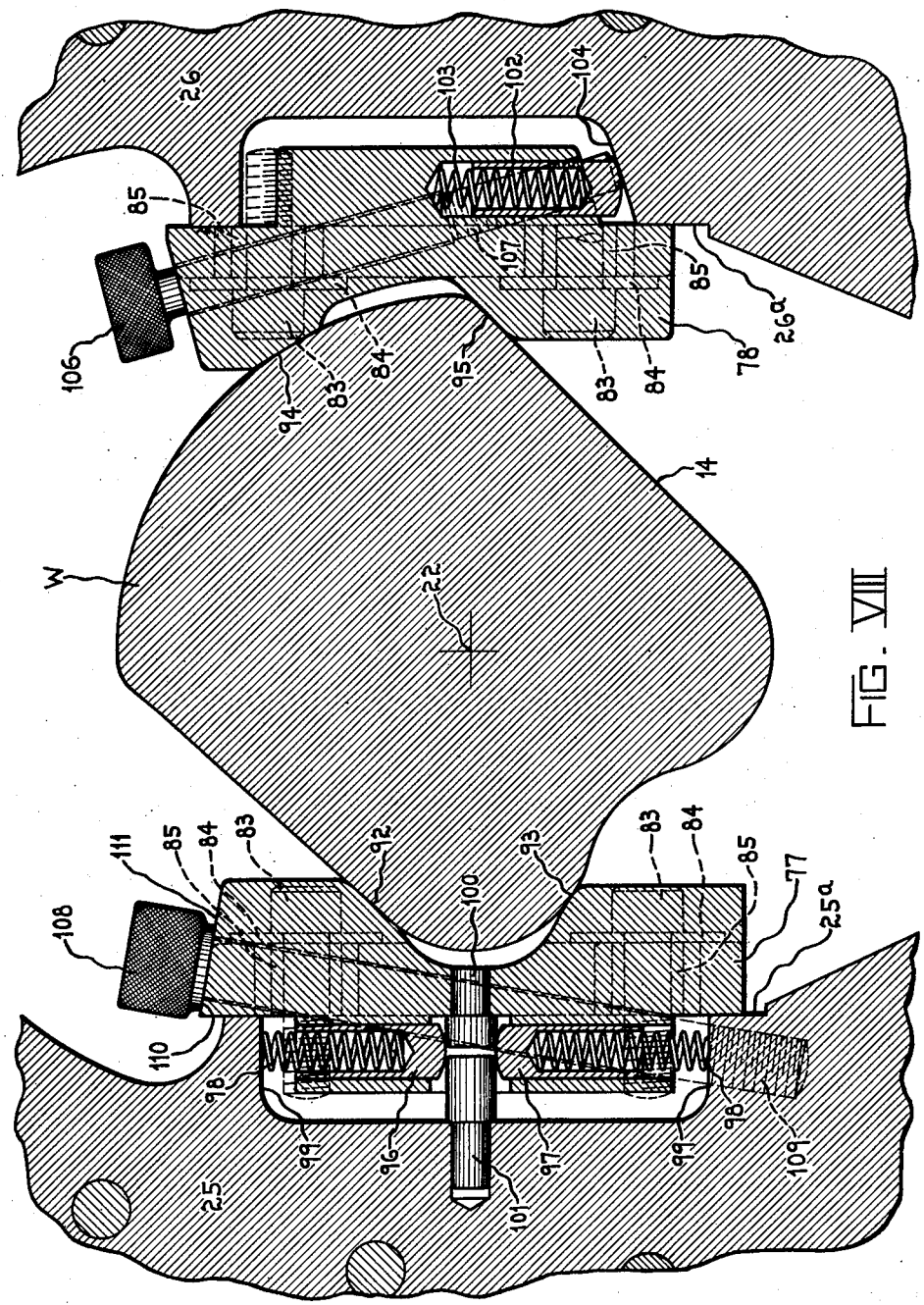
FIG. VIII
INVENTORS.
WILLIAM F. GROENE
HAROLD J. SIEKMANN
AND WALTER R. MEYER
BY
ATTORNEY.

Patented Feb. 18, 1941

2,232,226

UNITED STATES PATENT OFFICE 2,232,226

CRANKSHAFT CHUCK

William F. Groene, Harold J. Siekmann, and Walter R. Meyer, Cincinnati, Ohio, assignors to The R. K. Le Blond Machine Tool Company, Cincinnati, Ohio, a corporation of Delaware Application October 14, 1939, Serial No. 299,560

21 Claims. (Cl. 82—40)

This invention pertains to chucking mechanism for rough irregular work pieces to be machined in machine tools. More particularly this invention pertains to chucks for gripping rough irregular work pieces, such as crankshafts, in a center drive lathe.

The main purpose of this invention is to provide a chucking device which will grip and drive a prelocated work piece with great rigidity and accuracy so that heavy machining may be undertaken on the work without its slipping in the chucking device while at the same time producing work of a high degree of accuracy and finish.

One object of this invention is to provide a chuck for a lathe which is adapted to engage a rough irregular work piece such as a crankshaft forging or casting which has been previously centered in the lathe on its proper axis of rotation, the work when gripped by the chuck being maintained undisturbed in its true centered position while being held rigidly in said position during the machining operation on the work piece. This object has heretofore been practically impossible of attainment because of the great difficulty of attempting to engage a rough prelocated work piece with sufficient rigidity to securely hold it during the machining operation while at the same time maintaining the work in its accurate precentered position while being gripped by the chucking device.

Another object of this invention is to provide a chuck for engaging a rough, irregular, prelocated work piece without distorting it from its prelocated position in which a clamp mechanism is provided which fully equalizes itself while engaging the rough work and which automatically locks itself and the work rigidly in the chuck with the operation of a single operating means.

A further object is to provide in a chuck, adapted to engage a rough, irregular, prelocated work piece without distorting it from its prelocated position, clamping means for engaging the irregular work piece from opposite sides which may be actuated by means causing said clamping means to automatically engage the work from each side with equal force without distorting the work from its prelocated position and which clamping means automatically locks itself against further movement relative to the chuck body when fully engaged so as to rigidly support and drive the work piece during the machining operations to be performed.

Another object is to provide in a chuck, adapted to engage a rough, irregular, prelocated work piece without distorting it from its prelocated position, clamping means for engaging the irregular work piece from opposite sides which is operated by a unique differential nut and screw arrangement so as to cause said clamping means to automatically engage the work piece from each side with equal force without distorting the work from its prelocated position said differential mechanism being operable by a single actuating means and which mechanism automatically locks said clamping means against further movement relative to the chuck body when the clamping means is fully engaged on the work.

And a still further object is to provide in conjunction with the clamping means of the above mentioned chucking mechanism a unique rough work surface engaging jaw arrangement which provides for the firm and accurate engagement of the clamping means with the rough work piece.

Further features and advantages of this invention will appear in the following detailed description of the drawings in which:

Figure I is an end elevation of one of the center drive ring gears of a double center drive lathe showing an exemplary application of this chucking mechanism to gripping a rough irregular web of a crankshaft to be machined in said lathe.

Figure II is an end elevation similar to that of Figure I showing this chucking mechanism as applied in the other of said center drive ring gears.

Figure III is an enlarged section through the differential nut and screw arrangement for operating the clamping means shown substantially on the line III—III of Figures IV and V.

Figure IV is an enlarged section through the mechanism of Figure III substantially on the line IV—IV of Figures I, II, III, and V.

Figure V is a vertical transverse section through the differential nut and screw arrangement substantially on the line V—V of Figures I, II, III, and IV.

Figure VI is a diagrammatic view showing the relationship of the centers for supporting the ends of a crankshaft and the double center drive chucking devices incorporating the chucking mechanism of this invention.

Figure VII is an enlarged section through the work engaging jaws of the chucking mechanism of Figure I substantially on the line VII—VII of Figure VI.

Figure VIII is an enlarged section through the work engaging jaws of the chucking mechanism of Figure II substantially on the line VIII—VIII of Figure VI.

For illustrative purposes this invention is shown applied to chucking a crankshaft in a double center drive crankshaft lathe of a character shown in Patents Re. 20,090 and 2,069,107. Noting Figure VI, a typical crankshaft W to be machined in such a lathe comprises the line bearings 1, 2, and 3 and the flange end 4 and stub end 5 which are to be turned, the pin bearings 6, 7, 8, and 9, and the interconnecting rough, irregular webs 10, 11, 12, 13, 14, and 15. The ends of the crankshaft W are supported on the usual lathe centers 16 and 17 carried in appropriate tailstocks 18 and 19. Intermediate these centers are the center drive ring gears 20 and 21 which completely surround the crankshaft W and are driven in any suitable manner as outlined in the above mentioned patents.

In each of these ring gears 20 and 21 is mounted respectively the chucking mechanism of Figures I and II the chief function of this mechanism being to rigidly grip, support, and drive the crankshaft by engaging the respective rough irregular webs 11 and 14 of the crankshaft without distorting the shaft from its true axis of rotation 22 previously established by the centers 16 and 17 when engaged with the ends of the work.

In each of the ring gears 20 and 21 are respectively provided the clamping arms 23 and 24, and 25 and 26 each pivotally mounted on pins 27 carried in the segmental blocks 28 and 29 fixed in these ring gears by suitable screws 30. In the upper ends of these clamping arms (Figures III and IV) are pivotally mounted the crankshafts 31 on suitable trunnions 32 which are connected by means of the pins 33 to the screws 34 and 35 which operate in the rotatable nuts 36 and 37 carried in the thrust bearings 38 in the bore 39b of the differential housing 39 fixed in the ring gears by suitable screws 40. On each of these nuts are formed bevel gears 41 which take the outward thrust of these nuts against the inner races 38a of the bearings 38. The outer races 38b are axially confined in the bore 39b by the shoulder 42 of the housing 39 and the face 43 of the bushing 44 threaded at 45 in this bore. Inward thrust on these nuts 36 and 37 is taken care of by the thrust bearings 46 and 47, the bearing 46 having its inner race 48 bearing against the face 49 of the bushing 44 while its outer race 50 abuts against the adjusting nut 51 threaded to the nut 36 through the thrust collar 52. A suitable packing 53 carried in the bushing 44 and engaging the outer race 50 of the bearing 46 precludes the escape of lubricant or entrance of foreign matter in the mechanism in the bore 39b of the housing 39. Similarly the bearing 47 has its inner race 54 bearing against the face 55 of the bushing 56 fixed in the housing 39 while its outer race 57 abuts against the adjusting nut 58 threaded to the nut 37 through the thrust collar 59. A suitable packing 60 carried in the bushing 56 and engaging the outer race 57 of the bearing 47 precludes the escape of lubricant or entrance of foreign matter in the mechanism in the bore 39b of the housing 39.

Journaled in the bore 39b of the housing 39 is the differential cage comprising the worm ring 61 and the plane ring 62 which are fixed together by tapered pins 63 and nuts 64. This cage is thus parted on the line 65 so that the bevel pinions 66 having trunnions 67 may be journaled in the bore 68 formed in this cage so that these bevel pinions 66 simultaneously engage the bevel gears 41 of the nuts 36 and 37 so that rotation of the cage cause one or the other or both of said nuts to be rotated with equal force. On the worm ring 61 is formed a worm wheel 69 which is engaged by the worm 70 (Figure V) fixed on the actuating shaft 71 journaled on bearings 72 and 73 in the housing 39, the end of this shaft 71 being provided with a suitable splined socket 74 into which may be inserted an appropriate wrench for rotating it for actuating the differential cage for moving the clamping arms to or from the work W.

On each of the clamping arms 23, 24, 25, and 26 are the respective work engaging jaws 75, 76, 77, and 78. Noting particularly Figures I and VII, on the arm 23 is fixed the jaw 75 by means of the tongue 79 and the screws 80, this jaw having work engaging abutments 81 and 82 for engaging the rough web 11 of the crankshaft W. On the other arm 24 is mounted the jaw 76 to slide vertically on the surface 24a of the arm. Suitable screws 83 passing through washers 84 and spacing collars 85 serve to properly maintain this sliding movement of the jaw 76 on this arm. This jaw has work engaging abutments 86 and 87 for engaging the rough web 11. A plunger 88 slidably mounted in a bore 89 in the jaw 76 is urged outwardly by the spring 90 against surface 91 of the arm 24 to normally urge the jaw 76 downwardly.

Noting Figures II and VIII, the jaws 77 and 78 are vertically slidably mounted on the surfaces 25a and 26a of the arms 25 and 26 by the screws 83, washers 84, and spacing collars 85 as the jaw 76 on the arm 24. The jaw 77 has work engaging abutments 92 and 93 while the jaw 78 has work engaging abutments 94 and 95. In the jaw 77 are slidably mounted a pair of opposed plungers 96 and 97 each actuated by springs 98 bearing against the surface 99 of the arm 25 to simultaneously engage a pin 100 fixed in the jaw 77 and a similar pin 101 fixed in the arm 25 so as to permit yielding sliding movement in the jaw 77 while at the same time providing a self-centering arrangement for keeping the jaw normally midway of the limits of its sliding movement. The jaw 78 is provided with a plunger 102 urged by a spring 103 against the surface 104 of the arm 26 to normally urge this jaw 78 upwardly. In each of the jaws 76 and 78 are threaded the respective thumb screws 105 and 106 by the threads 107, these screws projecting to engage the respective surfaces 107a and 104 of these arms to limit downward movement of these jaws. In the jaw 77 is provided a thumb screw 108 which is threaded at 109 in the arm 25 and has a shoulder 110 engaging against the surface 111 of the jaw 77 to prevent upward movement of this jaw.

The operation of this invention as applied to a double center drive crankshaft lathe is substantially as follows: the work or crankshaft W is first inserted axially through the center drive ring gears 20 and 21 and placed on the centers 16 and 17 in the usual manner so as to properly center it on the axis of rotation 22 of the lathe. The crankshaft is located approximately circumferentially about this axis as shown in Figures I, II, VII, and VIII either manually or by a suitable loading device such as shown for example in Patent 1,700,721.

Having thus prelocated the crankshaft in the lathe, a wrench is applied to the socket 74 of the shaft 71 to rotate it thus bringing the clamping arms 23 and 24 together from the position 25b and 26b shown in Figure III by means of the differential nut and screw mechanism described. In this way the jaws 75 and 76 are brought up against the web 11 from opposite sides of the work and with equal force without causing axial displacement of the crankshaft W from the axis 22. Should one or the other of these jaws engage the work before the other, the one first engaging the work will be stopped by relative light contact with the work W and without distorting the shaft while the other jaw continues to move into engagement with the work to ultimately bring both jaws in rigid and firm engagement with the web 11 at the time of final tightening.

It is important to note that by use of this unique differential nut and screw mechanism not only is this powerful fully equalized clamping effected without distorting the work but by this arrangement the clamping means is self-locking to automatically hold the clamping means positively in clamped position this being accomplished by arranging the screws 34 and 35 and their nuts 36 and 37 with appropriate self-locking leads so that endwise pressure on these screws will not rotate these nuts. It is also to be noted that as a further precaution the worm 70 and worm wheel 69 are arranged to be self-locking so that the nuts 36 and 37 are locked against any rotation unless rotated by the worm actuating shaft 71.

Noting particularly Figure VII, as the clamp arms 23 and 24 come together toward the web 11 the plunger 88 has the jaw 76 yieldingly moved to the downward position so that the abutment 86 of this jaw first engages the web 11. This causes the crankshaft to rotate clockwise to automatically bring the web in engagement with the abutment 81 of the jaw 75, the surface 82 W of the web 11, being concentric about the axis 22 coming into engagement with the abutment 82 of the jaw 75 as arm 23 moves to the work W. Further final tightening of these arms 23 and 24 causes the abutment 86 of the jaw 76 to slide up on the web W raising this block and compressing the spring 90 in the plunger 88 to bring the abutment 87 of this jaw into proper engagement with the crankshaft web. By this means the rough irregular web 11 is securely gripped between these jaws 75 and 76 without distorting the crankshaft from its true position about the axis 22. Ordinarily this form of clamping is sufficient to properly hold the crankshaft during the turning operations on its various bearing portions since the jaw 75 is fixed on the arm 23 and since the frictional engagement of the jaw 76 with the surface 24a of the arm 24 is so great under the powerful clamping action set up by the differential clamping mechanism that this jaw is substantially fixedly held on this arm 24.

The chuck may be rotated in either direction. However, in this particular example it is preferable to rotate the chuck clockwise because the particular irregular shape of the web 11 here shown provides better driving or rotating surfaces at 81 and 87 than the substantially peripheral surfaces at 82 and 86. As an added precaution to make sure the jaw 76 does not slide on the arm 24 when the chuck is rotating counterclockwise under excessively heavy cutting, the thumb screw 105, which is unscrewed so that its end 105a is fully withdrawn so as not to contact the surface 107a of the arm 24 during the initial clamping operation, is screwed down against the surface 107a after the work is finally tightened in the chuck so that the jaw 76 is held positively against downward movement created by the driving action at 87.

Having thus fully clamped up the work in the chuck in ring gear 20, the chuck in ring gear 21 is next operated similarly by actuating its worm shaft 71 by applying a wrench to the socket 74 of the shaft to bring the jaws 25 and 26 in toward the work from the position shown at 25b and 26b shown in Figure III. In this chuck the jaws 77 and 78 are brought into engagement with the web 14 by the respective arms 25 and 26, the chucking operation differing from that in the chuck or ring gear 20 in that the crankshaft does not rotate about its axis as the jaws engage it since the crankshaft has been previously gripped in the chuck of ring gear 20 against such rotation. As these arms 25 and 26 approach the work W the jaw 77, being floatingly mounted, engages the work and adjusts itself until both of its abutments 92 and 93 automatically engage themselves properly on the web 14. The abutment 95 of the jaw 78 first comes into engagement with the web 14 due to the upward movement of this jaw caused by the plunger 102, this abutment 95 sliding up on the web during the final tightening to bring the abutment 94 into proper engagement with the web in a manner similar to that of jaw 76 of the other chuck. Ordinarily the frictional engagement of these jaws 77 and 78 with the surfaces 25a and 26a of the arms 25 and 26 is ample to properly hold the crankshaft during the turning operations to be done on its various bearing portions.

This chuck may also be rotated in either direction but is preferably rotated counter-clockwise, and, of course, in the same direction as the first described chuck when they are used together, because the particular irregular shape of the web 14 here shown provide better during or rotating surfaces at 92 and 95. As an added precaution to make sure the jaws 77 and 78 do not slide on the arms 25 and 26 when the chuck is rotating counter-clockwise under excessively heavy cutting, the thumb screws 108 and 106, which are unscrewed to inoperative positions during the initial clamping operation, are screwed down so as to prevent upward movement in jaw 77 and downward movement in jaw 78 so that these jaws are positively held against such movements created by the driving action at 92 and 95. In this way the crankshaft is securely and accurately chucked by means of its rough webs in a double center drive crankshaft lathe.

To unchuck the work at the end of the cutting cycle the worm shafts 71 of the chucks are rotated to move the arms back to the positions 25b and 26b of Figure III and the thumb screws 105, 106, and 108 unscrewed to their inoperative positions.

While we have here described the particular application of this invention to a double center drive lathe using a pair of these chucking devices, it is to be understood that each of these chucks can be used independently with equal facility in a single center drive lathe requiring only one of such chucks.

Having thus fully set forth and described our invention, what we claim and desire to secure by United States Letters Patent is:

1. In a chuck, a pair of clamping means arranged to engage a work piece in said chuck from opposite sides, means for moving each of said clamping means into said work with equal force, and means in connection with said last mentioned means for automatically locking said clamping means in engaged position with said work piece.

2. In a chuck, a rotatable chuck body, a pair of movable clamping means mounted on said body, differentially operated means for moving said clamping means into engagement with a work piece in the chuck so that each of said clamping means engages said work with equal force and means incorporated in said differential means for locking said clamping means to said chuck body when said clamping means are engaged with said work piece.

3. In a chuck, a rotatable chuck body, clamping means movably mounted on said body, differentially operated means for moving said clamping means relative to a work piece in the chuck, and means incorporated in said differential means for automatically locking said clamping means to said chuck body when said differential means is not operating.

4. In a chuck, a rotatable chuck body, clamping means movably mounted on said body relative to a work piece in said chuck, work engaging members on said clamping means, means for moving said clamping means to engage said members with equal force on said work piece, and means for automatically locking said clamping means to said chuck body when said members are engaged with said work piece.

5. In a chuck, a rotatable chuck body, clamping means movably mounted on said body relative to a work piece in said chuck, work engaging members movably mounted on said clamping means, means for moving said clamping means to engage said members on said work piece, and means for locking said clamping means to said chuck body when said members are engaged with said work piece.

6. In a chuck, a rotatable chuck body, clamping means movably mounted on said body relative to a work piece in said chuck, work engaging members movably mounted on said clamping means, means for moving said clamping means to engage said members on said work piece, and means for locking said clamping means to said chuck body when said members are engaged with said work piece.

7. In a chuck, a rotatable chuck body, clamping means movably mounted on said body relative to a work piece in said chuck, work engaging members movably mounted on said clamping means, means for moving said clamping means to engage said members on said work piece, and means for automatically locking said clamping means to said chuck body and said members to said clamping means when said members are engaged with said work piece.

8. In a chuck, a rotatable chuck body, clamping means movably mounted on said body relative to a work piece in said chuck, work engaging members movably mounted on said clamping means, means for moving said clamping means to engage said members on said work piece, means for automatically locking said clamping means to said chuck body and said members to said clamping means when said members are engaged with said work piece, and means for positively fixing said members on said clamping means when said members have been fully engaged on said work piece.

9. In a chuck, a rotatable chuck body, clamping means movably mounted on said body relative to a work piece in said chuck, work engaging members movably mounted on said clamping means for movement substantially perpendicular to the direction of movement of said clamping means, and means for moving said clamping means to engage said members on said work piece.

10. In a chuck, a rotatable chuck body, clamping means movably mounted on said body relative to a work piece in said chuck, work engaging members movably mounted on said clamping means for movement substantially perpendicular to the direction of movement of said clamping means, means for moving said clamping means to engage said members on said work piece with equal force, and means for automatically locking said clamping means on said chuck body and said members to said clamping means when said members are engaged with said work piece.

11. In a chuck, a rotatable chuck body, clamping means movably mounted on said body relative to a work piece in said chuck, work engaging members movably mounted on said clamping means for movement substantially perpendicular to the direction of movement of said clamping means, and a single operating means for moving said clamping means to engage said members on said work piece with equal force.

12. In a chuck, a rotary chuck body, a pair of clamping arms pivotally mounted on said chuck body, a pair of nuts journaled against axial movement on said chuck body, screws operating in said nuts each connected to one of said arms, and means for simultaneously differentially rotating said nuts for axially moving said screws to effect swinging movements in said arms.

13. In a chuck, a rotary chuck body, a pair of clamping arms pivotally mounted to one side of the axis of rotation of said chuck body, a pair of nuts journaled against axial movement in said body on the other side of said axis, screws operating in said nuts each connected to one of said arms, a bevel gear formed on each of said nuts, a differential cage carrying rotatable bevel pinions engaging the bevel gears on said nuts journaled in said body, means on said arms to engage a prelocated work piece in the chuck, and means for rotating said cage to effect movement of said arms relative to said work piece.

14. In a chuck, a rotary chuck body, a pair of clamping arms pivotally mounted to one side of the axis of rotation of said chuck body, a pair of nuts journaled against axial movement in said body on the other side of said axis, screws operating in said nuts each connected to one of said arms, a bevel gear formed on each of said nuts, a differential cage carrying rotatable bevel pinions engaging the bevel gears on said nuts journaled in said body, means on said arms to engage a prelocated work piece in the chuck, a worm wheel on said cage, a worm rotatably mounted in said body and engaging said worm wheel and a single means for rotating said worm to effect movement of said arms relative to said work piece.

15. In a chuck, a rotatable chuck body, a pair of clamping means movably mounted on said body relative to a work piece in said chuck, work engaging members, one fixed on one of said clamping means the other movable on the other of said clamping means, and differential actuating means for simultaneously actuating said clamping means to engage said work engaging means with equal force on said work piece.

16. In a chuck, a rotatable chuck body, a pair of clamping means movably mounted on said body relative to a work piece in said chuck, work engaging members, one fixed on one of said clamping means the other movable on the other of said clamping means, substantially perpendicular to the direction of movement of said clamping means, and differential actuating means for simultaneously actuating said clamping means to engage said work engaging means with equal force on said work piece.

17. In a double center drive lathe, centers for centering a work piece on the axis of rotation of said lathe, a pair of center drive ring gears in said lathe located between said centers, a chucking device in one of said ring gears for gripping said work piece comprising a pair of clamping members movably mounted on said ring gear, a work engaging jaw fixed on one of said clamping members, a work engaging jaw movable on the other of said members substantially perpendicular to the direction of movement of said clamping members, and differential actuating mechanism mounted in said ring gear for said clamping members to effect engagements of said jaws with equal force on said work piece, and a chucking device in the other of said ring gears for gripping said work piece comprising a pair of clamping members movably mounted on said other ring gear, a work engaging jaw movably mounted on each of said clamping members substantially perpendicular to the direction of movement of said clamping member in this other chuck, and differential actuating mechanism mounted in this ring gear for said clamping members to effect engagement of said jaws with equal force on said work piece.

18. In a double center drive lathe, centers for centering a work piece on the axis of rotation of said lathe, a pair of center drive ring gears in said lathe located between said centers, a chucking device in one of said ring gears for gripping said work piece comprising a pair of clamping members movably mounted on said ring gear, a work engaging jaw fixed on one of said clamping members, a work engaging jaw movable on the other of said members substantially perpendicular to the direction of movement of said clamping members, and differential actuating mechanism mounted in said ring gear for said clamping members to effect engagements of said jaws with equal force on said work piece and a chucking device in the other of said ring gears for gripping said work piece comprising a pair of clamping members movably mounted on said other ring gear, a work engaging jaw movably mounted on each of said clamping members substantially perpendicular to the direction of movement of said clamping member in this other chuck, and differential actuating mechanism mounted in this ring gear for said clamping members to effect engagement of said jaws with equal force on said work piece and means in connection with said jaws of said first mentioned chuck for automatically circumferentially locating said work piece in said chucking devices.

19. In a double center drive lathe, centers for centering a work piece on the axis of rotation of said lathe, a pair of center drive ring gears in said lathe located between said centers, a chucking device in one of said ring gears for gripping said work piece comprising a pair of clamping members movably mounted on said ring gear, a work engaging jaw fixed on one of said clamping members, a work engaging jaw movable on the other of said members substantially perpendicular to the direction of movement of said clamping members, and differential actuating mechanism mounted in said ring gear for said clamping members to effect engagements of said jaws with equal force on said work piece, and a chucking device in the other of said ring gears for gripping said work piece comprising a pair of clamping members movably mounted on said other ring gear, a work engaging jaw movably mounted on each of said clamping members substantially perpendicular to the direction of movement of said clamping member in this other chuck, and differential actuating mechanism mounted in this ring gear for said clamping members to effect engagement of said jaws with equal force on said work piece, means in connection with said jaws of said first mentioned chuck for automatically circumferentially locating said work piece in said chucking devices, and means for automatically locking said clamping members to said ring gears when said jaws are engaged on said work piece.

20. In a double center drive lathe, centers for centering a work piece on the axis of rotation of said lathe, a pair of center drive ring gears in said lathe located between said centers, a chucking device in one of said ring gears for gripping said work piece comprising a pair of clamping members movably mounted on said ring gear, a work engaging jaw fixed on one of said clamping members, a work engaging jaw movable on the other of said members substantially perpendicular to the direction of movement of said clamping members, and differential actuating mechanism mounted in said ring gear for said clamping members to effect engagements of said jaws with equal force on said work piece, and a chucking device in the other of said ring gears for gripping said work piece comprising a pair of clamping members movably mounted on said other ring gear, a work engaging jaw movably mounted on each of said clamping members substantially perpendicular to the direction of movement of said clamping member in this other chuck, and differential actuating mechanism mounted in this ring gear for said clamping members to effect engagement of said jaws with equal force on said work piece, means in connection with said jaws of said first mentioned chuck for automatically circumferentially locating said work piece in said chucking devices, and means for automatically locking said clamping members to said ring gears and said movable jaws to said clamping members when said jaws are engaged on said work piece.

21. In a double center drive lathe, centers for centering a work piece on the axis of rotation of said lathe, a pair of center drive ring gears in said lathe located between said centers, a chucking device in one of said ring gears for gripping said work piece comprising a pair of clamping members movably mounted on said ring gear, a work engaging jaw fixed on one of said clamping members, a work engaging jaw movable on the other of said members substantially perpendicular to the direction of movement of said clamping members, and differential actuating mechanism mounted in said ring gear for said clamping members to effect engagements of said jaws with equal force on said work piece, and a chucking device in the other of said ring gears for gripping said work piece comprising a pair of clamping members movably mounted on said other ring gear, a work engaging jaw movably mounted on each of said clamping members substantially perpendicular to the direction of movement of said clamping member in this other chuck, and differential actuating mechanism mounted in this ring gear for said clamping members to effect engagement of said jaws with equal force on said work piece, means in connection with said jaws of said first mentioned chuck for automatically circumferentially locating said work piece in said chucking devices, means for automatically locking said clamping members to said ring gears and said movable jaws to said clamping members when said jaws are engaged on said work piece, and means for positively fixing said movable jaws on said clamping members.

WILLIAM F. GROENE.
HAROLD J. SIEKMANN.
WALTER R. MEYER.